United States Patent [19]

Heilweil et al.

[11] Patent Number: 4,619,773

[45] Date of Patent: Oct. 28, 1986

[54] HIGH TEMPERATURE STABLE AQUEOUS BRINE FLUIDS VISCOSIFIED BY WATER-SOLUBLE COPOLYMERS OF ACRYLAMIDOMETHYLPROPANESULFONIC ACID SALTS

[75] Inventors: Israel J. Heilweil, Princeton; Dennis H. Hoskin, Lawrenceville, both of N.J.

[73] Assignee: Mobil Oil Corporation, New York, N.Y.

[21] Appl. No.: 731,051

[22] Filed: May 6, 1985

Related U.S. Application Data

[63] Continuation-in-part of Ser. No. 490,623, May 2, 1983.

[51] Int. Cl.$^4$ ................................................ C09K 7/02
[52] U.S. Cl. .................................. 252/8.514; 175/65; 252/8.551; 252/8.51
[58] Field of Search ............ 252/8.5 A, 8.5 B, 8.55 R; 166/273, 275; 175/65

[56] References Cited

U.S. PATENT DOCUMENTS

| | | | |
|---|---|---|---|
| 3,679,000 | 7/1972 | Kaufman | 252/8.55 D |
| 4,175,042 | 11/1979 | Mondshine | 252/8.5 A |
| 4,201,679 | 5/1980 | Barker | 252/8.5 B |
| 4,309,523 | 1/1982 | Engelhardt | 526/240 |
| 4,357,245 | 11/1982 | Engelhardt | 252/8.5 A |
| 4,394,273 | 7/1983 | Hoff | 252/8.5 A |
| 4,435,564 | 3/1984 | House | 252/8.5 A |

*Primary Examiner*—Theodore Morris
*Attorney, Agent, or Firm*—Alexander J. McKillop; Michael G. Gilman; Charles J. Speciale

[57] ABSTRACT

An aqueous brine fluid is disclosed which contains a high salt concentration and a water-soluble copolymer of acrylamidomethylpropanesulfonic acid salts which serves to increase the viscosity thereof, particularly at elevated temperatures of above about 300° F. These fluids are particularly useful as fluids for drilling operations.

26 Claims, No Drawings

HIGH TEMPERATURE STABLE AQUEOUS BRINE FLUIDS VISCOSIFIED BY WATER-SOLUBLE COPOLYMERS OF ACRYLAMIDOMETHYLPROPANESULFONIC ACID SALTS

CROSS REFERENCE TO RELATED APPLICATIONS

The present application is a continuation-in-part application of U.S. patent application Ser. No. 490,623 filed May 2, 1983.

Copending application Ser. No. 413,571, filed Aug. 31, 1982, in the name of Israel J. Heilweil relates, inter alia, to drilling fluids viscosified by polyvinylpyrrolidone.

Copending application Ser. No. 413,575, filed Aug. 31, 1982, in the name of Israel J. Heilweil relates, inter alia, to drilling fluids containing a non-aqueous solvent such as an N-methyl-2-pyrrolidone. Thickeners including, e.g., polyvinylpyrrolidone may optionally be employed.

Copending application Ser. No. 454,204, filed Dec. 28, 1982, in the name of Israel J. Heilweil relates, inter alia, to drilling fluids viscosified by basic N-heterocyclic polymers such as polyvinyl pyridine.

The entire disclosures of these above-mentioned U.S. pat. applications are expressly incorporated herein by reference.

BACKGROUND OF THE INVENTION

The present invention relates to brine fluids, particularly drilling fluids which have high salt concentration and which are viscosified with water soluble copolymers of acrylamidomethylpropanesulfonic acid salts.

The Engelhardt et al. U.S. Pat. No. 4,309,523, the entire disclosure of which is expressly incorporated herein by reference, describes drilling muds (i.e. drilling fluids which contain clay) which drilling muds contain water-soluble copolymers of acrylamidomethylpropanesulfonic acid salts and other components.

During the drilling of an oil well, a usually aqueous fluid i.e., a drilling fluid is injected into the well through the drill pipe and recirculated to the surface in the annular area between the well-bore wall and the drill string. The functions of the drilling fluid include: lubrication of the drill bit, transportation of cuttings to the surface, counterbalancing formation pressure to prevent an influx of oil, gas or water into the well, maintenance of hole stability until casings can be set, suspension of solids when the fluid is not being circulated, and minimizing fluid loss into and possible associated damage/instability to the formation through which drilling is taking place.

Proper balancing of formation pressure is obtained by establishing fluid density at the desired level usually via the addition of barite (greater than or equal to 95% barium sulfate). Transportation of cuttings and their suspension when the drilling fluid is not circulating is related to the fluid viscosity and thixotropy which depend on solids content and/or use of a polymer. Filter loss control is obtained also by the use of clays and/or added polymers.

Drilling fluid properties are constantly monitored during the drilling operations and tailored to accommodate the nature of the formation stratum being encountered at the time. When drilling reaches the producing formation special concern is exercised. Preferentially low solids content drilling fluids are used to minimize possible productivity loss by solids plugging. Proper drilling fluid density for balancing formation pressure may be obtained by using high salt concentration aqueous brines while viscosity and filter loss control may be obtained by polymer addition. Substantial future oil well drilling will be at depths between 15 and 30 thousand feet where temperatures encountered can be 175° C. Temperatures such as these, coupled with the desire for low solids content and preferably minimum added solids, require brine tolerant and high temperature stable polymers for viscosity and filtration control. Conventionally employed polymers such as starch, carboxymethyl cellulose, and modified polyacrylates are not stable at such high temperatures and some have severe brine tolerance limitations.

Current high density, clear brine drilling fluid systems utilize hydroxyethyl cellulose polymers and related materials as viscosifiers, but these are normally unstable at about 150° C, and tend to crosslink and gel with time and temperature which may cause various drilling operational problems.

In drilling for oil and gas in formations rich in $CO_2$, such as the Mobile Bay and Arun fields, the use of clear brine completion, workover, and packer fluids containing divalent calcium and zinc can lead to precipitation of carbonates, plugging of wells, and subsequent loss of hydrocarbon productivity. Sodium bromide brines provide a possible alternative, but their utility has not been fully developed because of the unavailability of viscosifying agents and additives to provide suitable rheological properties for removal of drilled solids and to minimize filtration losses.

Even if a polymer is demonstrated as being soluble in a brine such as a sodium bromide brine, it is generally not possible to predict what effect the brine, particularly high concentrations thereof, will have on the thermal stability and thermal properties of the polymer.

SUMMARY

According to one aspect of the invention, there is provided a method for drilling a bore hole utilizing a drilling fluid or drilling mud, said drilling taking place at a depth where said drilling fluid or drilling mud becomes heated to a temperature of at least 150° C., said drilling fluid or drilling mud having a salinity of at least 30% by weight, said drilling fluid or drilling mud comprising filter loss control improving amount (i) of a water soluble copolymer consisting essentially of a random distribution of (a) 5 to 95% by weight of units of the formula

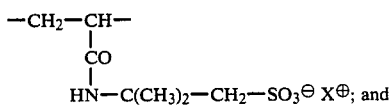

and (b) 5 to 95% by weight of units of the formula

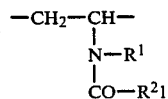

(c) 0 to 80% by weight of units of the formula

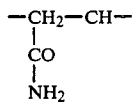

wherein $R^1$ and $R^2$ are the same or different and each is hydrogen, methyl or ethyl; and $X^\oplus$ is a cation; and (ii) a densifying amount of a densifying salt sufficient to densify said fluid, said densifying salt constituting at least about 30% by weight or even at least about 50% by weight of said fluid.

According to another aspect of the invention, there is provided a method for increasing the viscosity of an aqueous brine fluid, said method comprising combining with said brine fluid a viscosifying amount of the above-mentioned water-soluble copolymer of acrylamidomethylpropanesulfonic acid salts (i).

According to another aspect of the invention there is provided a method for flushing potentially formation-damaging materials comprising cuttings and clays from a well bore prior to perforation of a well, said method comprising injecting a drilling fluid comprising a completion fluid through the drill pipe of said well bore and recirculating said completion fluid to the surface in the annular area between the well-bore wall and the drill string, wherein said completion fluid is heated to a maximum temperature between 135° C. and 170° C. during said method, and wherein said completion fluid comprises an aqueous brine viscosified with a viscosity increasing amount of one or more of the above-mentioned water-soluble copolymers of acrylamidomethylpropanesulfonic acid salts (i).

DETAILED DESCRIPTION

One or more water-soluble copolymers of acrylamidomethylpropanesulfonic acid salts are added to aqueous high brine content solutions (e.g., 30–60% wt. salt) providing a liquid of substantially enhanced viscosity (i.e., a drilling fluid) which is particularly suitable for use in oil well drilling operations. The use of such polymers results in improved resistance to viscosity loss at elevated temperatures (e.g., more than about 150° C.) compared to conventional viscosity building water/brine soluble polymers and thus is useful as a drilling fluid in drilling operations involving deep wells. They may also provide some filtration control properties, reducing fluid loss into, and possible damage to, the oil bearing formation.

A preferred water-soluble copolymer of acrylamidomethylpropanesulfonic acid salts consists essentially of a random distribution of (a) 5 to 95% by weight of units of the formula

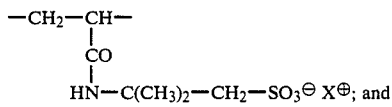

(b) 5 to 95% by weight of units of the formula

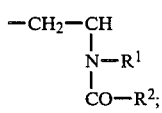

wherein $R^1$ and $R^2$ are the same or different and each is hydrogen, methyl or ethyl; and $X^\oplus$ is a cation. Such copolymers are described in the previously-mentioned Engelhardt et al U.S. Pat. No. 4,309,523 and preferably have a molecular weight of at least 10,000.

The effectiveness of polymers used according to the present invention as structural viscosity builders is exemplified by the following examples.

EXAMPLE

Vinyl sulfonate amide copolymers (HOE 3118 and 2825, Hoechst Corp.) will viscosify NaBr and $CaBr_2$ dense, clear brine drilling fluids (50% salt, 12.5 and 14.5 lbs./gal., respectively) and retain their viscosifying properties, especially with the case of HOE 3118, in 175°–200° C. range. By comparison, currently employed cellulosic viscosifiers become ineffective below 135° C.

Table 1 summarizes 16 hour static aging experiments with 5.0 wt % HOE 3118 and 2825 in NaBr brine (12.5 lbs./gal.) up to 176° C. and demonstrates little or no degradation for HOE 3118; HOE 2825 is stable up to about 150° C. At 200° C. (see Table 2) HOE 3118 retains its viscosifying properties for at least 4 hours. (The deviations are within experimental error.) After 16 hours heating at 200° C., the viscosity of HOE 3118 is decreased by 23%, but the inclusion of 0.6 wt % of N-methyl pyrrolodine as an additive improves the performance.

Table 1 summarizes 16 hour static aging experiments with 5.0 wt % HOE 3118 and 2825 in NaBr brine (12.5 lbs./gal.) up to 176° C. and demonstrates little or no degradation for HOE 3118; HOE 2825 is stable up to about 150° C. At 200° C. (see Table 2) HOE 3118 retains its viscosifying properties for at least 4 hours. (The deviations are within experimental error.) After 16 hours heating at 200° C., the viscosity of HOE 3118 is decreased by 23%, but the inclusion of 0.6 wt % of N-methyl pyrrolidone as an additive improves the performance. Table 3 describes 16 hour static aging experiments of HOE copolymers in $CaBr_2$ (14.5 lbs./gal.) and West Burkburnette (WBB) brines. The WBB brine contains 13 wt % NaCl, 3.45 wt % $CaCl_2$ $H_2O$ and 1.5 wt % $MgCl_2$ $6H_2O$. The WBB experiment relates to the ability of HOE 3118 to function as a mobility control agent. In $CaBr_2$ brine HOE 3118 is stable up to about 175° C.

TABLE 1

| NaBr BRINE (12.5 lbs./gal.) 5% VINYL AMIDE - VINYL SULFONATE POLYMERS STATIC AGING FOR 16 HOURS | | | | |
|---|---|---|---|---|
| | HEATING | APPARENT VISCOSITY, CP AT 25° AND 11.5 SEC$^{-1}$ | | |
| | TEMP., °C. | BEFORE | AFTER | % CHANGE |
| HOE 3118 | 90 | 38.0 | 37.5 | −1.3 |
| | 150 | 38.0 | 37.0 | −2.6 |
| | 176 | 35.5 | 36.5 | +2.8 |
| HOE 2835 | 90 | 99.5 | 97.5 | −2.0 |
| | 150 | 99.5 | 96.0 | −3.5 |
| | 169 | 92.0 | 55.5 | −40.0 |

TABLE 2

AGING EXPERIMENTS OF 5.0 wt % HOE 3118
IN NaBr (12.5 lbs./gal.) at 200° C.

| | Apparent Viscosity, cp, at 25° C. and 23 sec$^{-1}$ | | | |
|---|---|---|---|---|
| | BEFORE HEATING | HEATING DURATION | AFTER HEATING | % CHANGE |
| with | 35.0 cp | 3 hrs | 32.5 cp | −7.1 |
| 0.6 wt % | | 4.3 | 31.0 | −11.0 |
| N—Methyl | | 16 | 27.0 | −23.0 |
| Pyrrolidone | 35.5 cp | 3 | 37.0 | +4.2 |
| | | 4 | 39.0* | +9.9 |
| | | 16 | 30.0 | −15.5 |

*1 hour at 206° C.

TABLE 3

Viscosities of 2% by wt. HOE 2825 and 3118 before and after 16 hrs Heating

| | | | Apparent viscosity at 25° C., cp$^{(a)}$ | | |
|---|---|---|---|---|---|
| | Medium | Temp. °C. | Before | After | % Change |
| HOE 3118 | CaBr$_2$ | 175 | 29.3* | 34.8 | +16 |
| | WBB | 125 | 4.9 | 4.2 | −14 |
| | | | 10.7$^{(b)}$ | 9.7$^{(b)}$ | −9$^{(b)}$ |
| HOE 2825 | CaBr$_2$ | 175 | 33.3* | Gel | |
| | WBB | 125 | 5.5 | 3.2 | −42 |

$^{(a)}$All data at 115 sec$^{-1}$, except at 46 sec$^{-1}$ when indicated by *.
$^{(b)}$4% HOE in WBB.

HOE 3118 and HOE 2825 were examined by C$^{13}$ NMR using 7.0 wt % copolymer solutions in 30 wt % NaBr in D$_2$O. The analysis shows that HOE 3118 is composed of 62% 2-acrylamido-2-methylpropane-3-sulfonate (AMPS) and 38% N-vinyl-N-methyl acetamide (NMAA). HOE 2825, on the other hand, is composed of 41% AMPS, 31% NMAA, and 27% acrylamide (AM). Thus, the higher the thermal stability of HOE 3118 seems to be associated with its lack of primary amide groups. Primary amides are known to hydrolyze readily, but whether such hydrolysis is responsible for the inability of HOE 2825 to perform like HOE 3118 has not yet been fully confirmed.

The addition of N-methyl-2-pyrrolidone (MP) and the like (e.g., simple derivatives thereof) enhances the thermal stability of the brines of the present invention. For example, the addition of 9 wt % MP to an NaBr brine (12.5 lbs./gal.) containing 5 wt % of an HOE 3118 type polymer has been shown to markedly improve the thermal stability of the brine under extreme heating conditions in the 200°–220° C. range for 16 hours. The effectiveness of MP is believed to be due to its multifunctional properties as a buffering agent, as a molecule capable of complexing metal ions (e.g., Fe, Cr, Cu, Mn, etc.) that otherwise could lead to catalytic decomposition of copolymers, and as a peroxy radical terminator. In this connection, it has been reported in the Kanda et al U.S. Pat. No. 4,317,759 that the thermal stability of amide-containing polymers is enhanced by incorporation of synergistic combinations of mercaptobenzoimidazole and phenol derivatives during dissolution or synthesis.

High density, aqueous brine fluids comprising drilling fluids such as completion, workover, and packer fluids have become recognized in the last few years for their effectiveness in minimizing formation damage and providing wellbore stability, as well as in establishing and maintaining high productivity of oil and gas wells, G. Poole, Oil and Gas. J., July 13, 1981, p. 151; D. Acosta, Ibid., Mar. 2, 1981, p. 83; R. J. Spies et al., SPE 9425, September 1980.

Specifically, high density brine fluids are solutions containing 10 to 60 weight percent of densifying salts such as LiCl, NaCl, CaCL$_2$, CaBr$_2$, ZnBr$_2$ and their mixtures, having densities up to 2.4 g/cc (20 lbs./gal.). Their high salt content prevents swelling and dispersion of formation clays and shales by favorable ion exchange and osmotic pressure reduction. Their high densities provide sufficient hydrostatic head to balance formation pressures and thus prevent the influx of undesirable fluids into wells during drilling. Since they are free of dispersed solids, the high density fluids are particularly noted for their prevention of formation plugging, high hydrocarbon recovery, and efficient bottomhole cleaning.

With current accelerated efforts to discover new oil and gas deposits by deep drilling (say, below 10,000 feet) (Note B. Tippee, Oil and Gas J., Aug. 10, 1981, p. 33), it has become recognized that future developments in drilling fluid technology must make use of viscosifiers, fluid loss control agents, and other additives that are capable of satisfactory performance at high temperatures (135° C., 275° F.) and high pressure (5,000 psi). The use of water-soluble copolymers of acrylamidomethylpropanesulfonic acid salts may lead to particularly useful high temperature stable, high density brine fluids for drilling operations.

The embodiments of the Examples herein provide information and directions for other clear brines, polymers, and additives for high density, multifunctional fluids for deep well drilling, some examples of which include increasing M.W. to reduce the polymer content and hence cost; extending the system to include other highly temperature stable polymers; selecting other high density brines and brine mixtures, e.g., brines containing LiCl, CaI$_2$, Ca(SCN)$_2$, as well as the aforementioned NaCl, CaCL$_2$ CaBr$_2$ and ZnBr$_2$ as densifying salts with and without admixture of suitable solubilizing surfactants; selecting polar and hydrocarbon-derived solvents instead of water [note applicant's copending U.S. application Ser. No. 413,575, filed Aug. 31, 1982]; in situ polymerization of monomers in wells and in gas and oil formations containing highly concentrated brines, etc.

The viscosity increasing amount of polymer used in accordance with aspects of the present invention is that amount which is sufficient to achieve the desired viscosifying functions. In drilling, these functions involve transportation of cuttings to the surface and suspension of solids when the drilling fluid is not being circulated. The use of a viscosity increasing amount of polymer may result in an increase in viscosity at room temperature of a factor of, e.g., at least 4. In other terms, the amount of water-soluble copolymer of acrylamidomethylpropanesulfonic acid salts employed may be, e.g., about 0.5–10% by weight or as exemplified in the foregoing examples from about 2 to about 5% by weight of the fluid.

The salinity of the aqueous brine drilling fluid in accordance with aspects of the invention may be from at least 30% by weight up to the salt saturation point of the fluid, which is generally above about 50% by weight. The brine fluids of the present invention may have a density of, e.g., from about 12 to about 16 pounds per gallon.

Although the viscosifying effect of water-soluble copolymer of acrylamidomethylpropanesulfonic acid salts in accordance with aspects of the present invention is particularly useful in fluids for drilling in the vicinity of oil or gas producing formations, this effect may also be used when drilling in areas other than in the vicinity of oil or gas formations. Thus, viscosified drilling fluids containing water-soluble copolymers of acrylamidomethylpropanesulfonic acid salts may also contain constituents other than water and brine, such as filter loss control solids in an amount sufficient to prevent loss of fluid to the formation.

Viscosified aqueous brine fluids containing water-soluble copolymers of acrylamidomethylpropanesulfonic acid salts are felt to be useful in formations having a temperature of at least 150° C. (e.g., 150–230° C.). Such temperatures may occur at drilling depths of at least 15,000 feet (e.g., 15,000–30,000 feet).

The drilling fluids of the present invention preferably do not contain thermally unstable polymeric thickeners such as starch, carboxymethyl cellulose, and modified polyacrylates.

Although fluids of the present invention may be used while drilling is occurring, they may also be used in other aspects of drilling operations. For example, these fluids may be used as completion, packer and workover fluids. "Completion fluids" are those used to flush potentially formation-damaging materials (cuttings, clays) from the wellbore prior to perforation. "Packer fluids" are left in the annulus, between casing and tubing, when the well is placed on production. "Workover fluids," frequently clear brines, are used in cleaning and repairing old wells to increase productivity.

Particularly in the above-mentioned drilling operations, the viscosified fluids described herein may be used at elevated temperatures. More particularly, the HOE 2825 type polymers, i.e., those having acrylamide units, are felt to be thermally stable up to about 170° C. The HOE 3118 type polymers, i.e., those lacking acrylamide units, are felt to be thermally stable up to about 200° C. As mentioned previously, the HOE 3118 type polymers further stabilized with N-methyl-2-pyrrolidone, may remain thermally stable up to about 220° C. By way of contrast, conventionally employed cellulosic polymer viscosifiers decompose below 135° C. Accordingly, brines described herein are particularly useful in operations wherein the fluid is heated to temperatures above about 135° C.

Although water-soluble copolymer of acrylamidomethylpropanesulfonic acid salts/brine fluids have been described herein primarily with respect to their use as fluids in drilling operations, it will be understood that these fluids may also be quite useful in other fields. More particularly, these fluids should be applicable to a wide range of industrial applications, such as for example in processing minerals from salts solutions, in the production of specialty coatings, polymers, fibers, and membranes, in the formulation of "synthetic" water-based pneumatic fluids and novel lubricants, and in light energy conversion based on heat transport between concentrated and less concentrated brine layers in ponds.

The present invention may comprise, consist essentially of or consist of the materials or method steps described herein.

What is claimed is:

1. An aqueous brine fluid comprising:
   (i) a viscosity increasing amount of one or more water-soluble copolymers of acrylamidomethylpropanesulfonic acid salts, consisting essentially of a random distribution of
   (a) 5 to 95% by weight of units of the formula

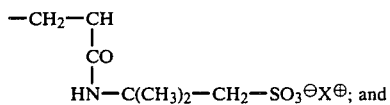

(b) 5 to 95% by weight of units of the formula

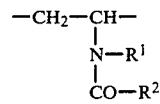

(c) 0 to 80% by weight of units of the formula

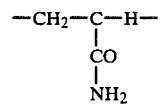

wherein $R^1$ and $R^2$ are the same or different and each is hydrogen, methyl or ethyl; and $X^\oplus$ is a cation; and
   (ii) a densifying amount of a densifying salt sufficient to densify said fluid, said densifying salt constituting at least about 30% by weight of said fluid.

2. A fluid according to claim 1, wherein the amount of said salt is from about 30% by weight of said fluid up to the salt saturation point of said fluid.

3. A fluid according to claim 1, wherein said copolymer comprises:
   (a) 5 to 95% by weight of units of the formula

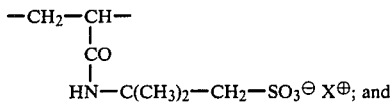

(b) 5 to 95% by weight of units of the formula

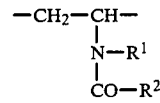

4. A fluid according to claim 1, wherein said viscosity increasing amount is sufficient to increase the viscosity of said brine fluid by a factor of at least 4 at room temperature.

5. A fluid according to claim 4, wherein said salt is selected from the group consisting of $CaBr_2$, $NaBr$, $KI$, $LiCl$, $CaCl_2$, $CaI_2$, $Ca(SCN)_2$ and mixtures thereof.

6. A fluid according to claim 4, wherein said salt is sodium bromide.

7. A fluid according to claim 4, wherein said salt is calcium chloride.

8. A method for drilling a wellbore, said method comprising injecting a drilling fluid through the drill pipe of said wellbore and recirculating said fluid to the surface in the annular area between the wellbore wall and the drill string, said fluid comprising an aqueous brine viscosified with a viscosity increasing amount of one or more water-soluble copolymers of acrylamidomethylpropanesulfonic acid salts, consisting essentially of a random distribution of (a) 5 to 95% by weight of units of the formula

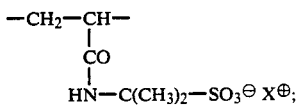

(b) 5 to 95% by weight of units of the formula

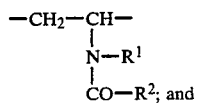

(c) 0 to 80% by weight of units of the formula

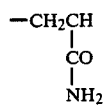

wherein $R^1$ and $R^2$ are the same or different and each is hydrogen, methyl or ethyl; and $X^\oplus$ is a cation.

9. A fluid according to claim 1 which does not contain clay.

10. A method for flushing potentially formation-damaging materials from a wellbore comprising, prior to perforation, inserting into said wellbore a completion fluid and flushing said wellbore with said completion fluid for removing from said wellbore potentially formation-damaging materials comprising cuttings and clays, said completion fluid comprising an aqueous brine viscosified with a viscosity increasing amount of one or more water-soluble copolymers of acrylamidomethylpropanesulfonic acid salts, consisting essentially of a random distribution of (a) 5 to 95% by weight of units of the formula

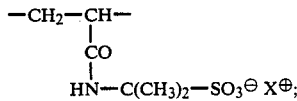

(b) 5 to 95% by weight of units of the formula

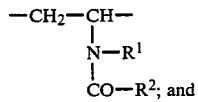

(c) 0 to 80% by weight of units of the formula

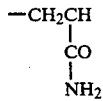

wherein $R^1$ and $R^2$ are the same or different and each is hydrogen, methyl or ethyl; and $X^\oplus$ is a cation.

11. A fluid according to claim 1 which further comprises a thermal stability enhancing amount of N-methyl-2-pyrrolidone.

12. A fluid according to claim 1 which is essentially solids-free.

13. A method for increasing the viscosity of an aqueous brine fluid, said method comprising combining with said brine fluid a viscosity increasing amount of one or more water-soluble copolymers of acrylamidomethylpropanesulfonic acid salts, consisting essentially of a random distribution of (a) 5 to 95% by weight of units of the formula

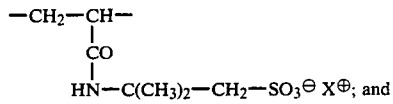

(b) 5 to 95% by weight of units of the formula

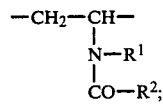

(c) 0 to 80% by weight of units of the formula

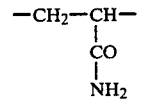

wherein $R^1$ and $R^2$ are the same or different and each is hydrogen, methyl or ethyl; and $X^\oplus$ is a cation.

14. The method of claim 13, wherein said copolymer comprises (a) 5 to 95% by weight of units of the formula

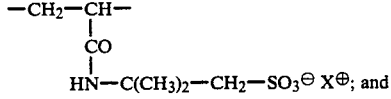

(b) 5 to 95% by weight of units of the formula

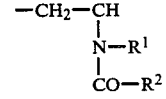

15. A method according to claim 13, wherein said viscosified brine fluid comprises at least about 30% by weight of salt.

16. A method according to claim 13, wherein said viscosified brine fluid comprises at least 50% by weight of salt.

17. A method according to claim 13, wherein said viscosity increasing amount is sufficient to increase the viscosity of said brine fluid by a factor of at least 4 at room temperature.

18. A method according to claim 15, wherein said salt is selected from the group consisting of $CaBr_2$, $NaBr$, $KI$, $LiCl$ $CaCl_2$, $CaI_2$, $Ca(SCN)_2$ and mixtures thereof.

19. A method according to claim 15, wherein said salt is sodium bromide.

20. A method according to claim 15, wherein said salt is calcium chloride.

21. A method according to claim 14, wherein said viscosified brine fluid does not contain clay.

22. A method according to claim 15, wherein said viscosified brine fluid is solids-free.

23. A method for drilling a wellbore, said method comprising injecting a drilling fluid through the drill pipe of said wellbore and recirculating said fluid to the surface in the annular area between the wellbore wall and the drill string, wherein said fluid is heated to a maximum temperature of between about 135° C. and about 200° C. during said method, and wherein said fluid comprises an aqueous brine viscosified with a viscosity increasing amount of one or more water-soluble copolymers of acrylamidomethylpropanesulfonic acid salts, consisting essentially of a random distribution of (a) 5 to 95% by weight of units of the formula

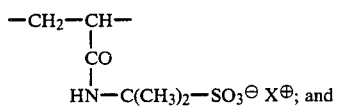

(b) 5 to 95% by weight of units of the formula

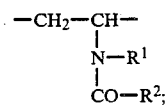

(c) 0 to 80% by weight of units of the formula

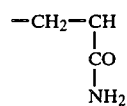

wherein $R^1$ and $R^2$ are the same or different and each is hydrogen, methyl or ethyl; and $X^+$ is a cation.

24. The method of claim 23 wherein said copolymer comprises:

(a) 5 to 95% by weight of units of the formula

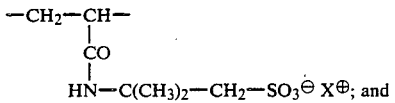

(b) 5 to 95% by weight of units of the formula

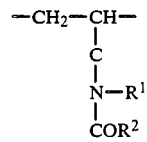

25. A method according to claim 23, wherein said fluid is essentially solids-free and comprises at least about 30% by weight of sodium bromide.

26. A method according to claim 23, wherein said fluid is essentially solids-free and comprises at least about by weight of calcium chloride.

* * * * *

UNITED STATES PATENT AND TRADEMARK OFFICE
CERTIFICATE OF CORRECTION

PATENT NO. : 4,619,773

DATED : October 28, 1986

INVENTOR(S) : I.J. Heilweil and D.H. Hoskin

It is certified that error appears in the above-identified patent and that said Letters Patent is hereby corrected as shown below:

Column 5, line 33, after "AMPS" insert --  (a Federally registered trademark of The Lubrizol Corporation)--

Signed and Sealed this

Fourteenth Day of April, 1987

Attest:

DONALD J. QUIGG

Attesting Officer

Commissioner of Patents and Trademarks